Oct. 3, 1933.                      L. O. FRENCH                          1,928,754
             METHOD OF AND APPARATUS FOR PREPARING AND USING FUEL
                        IN INTERNAL COMBUSTION ENGINES
                            Filed Oct. 22, 1927            2 Sheets-Sheet 1
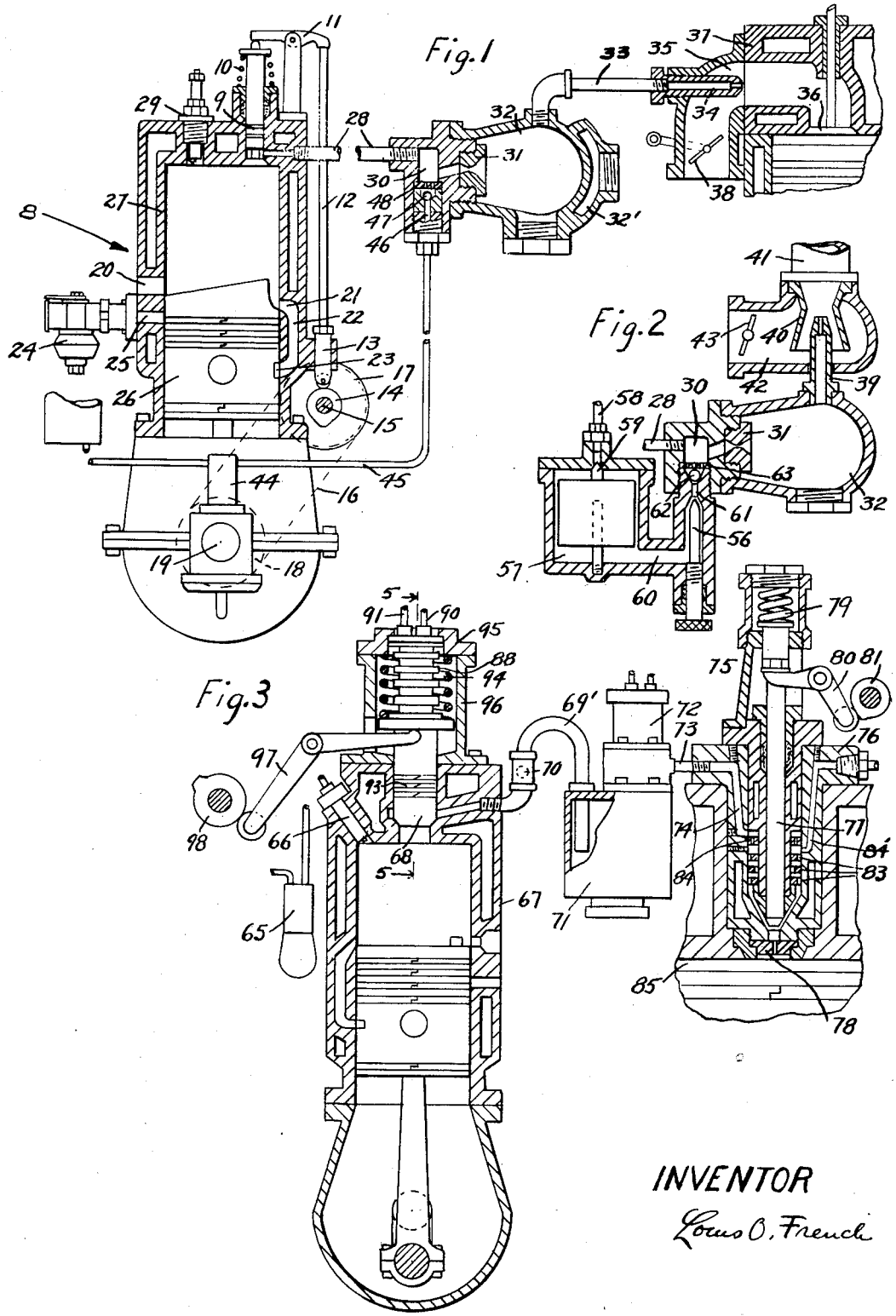
INVENTOR
Louis O. French

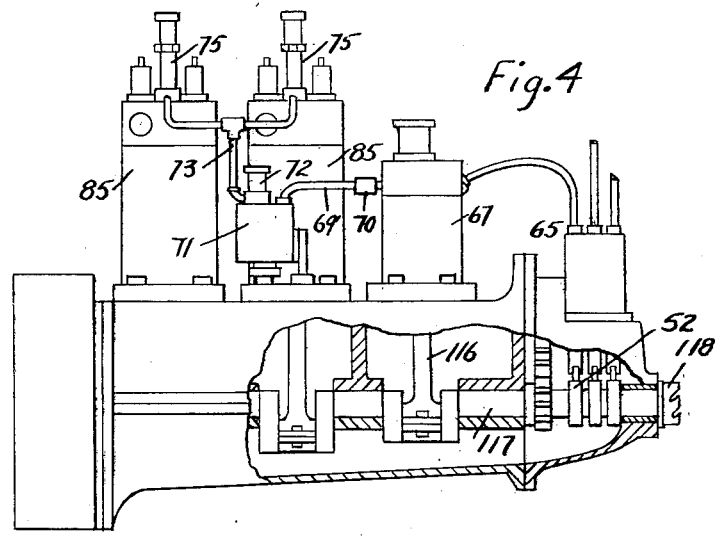
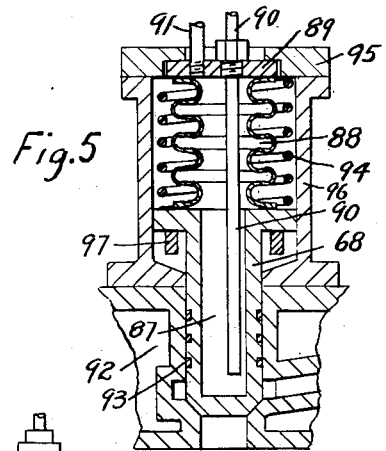
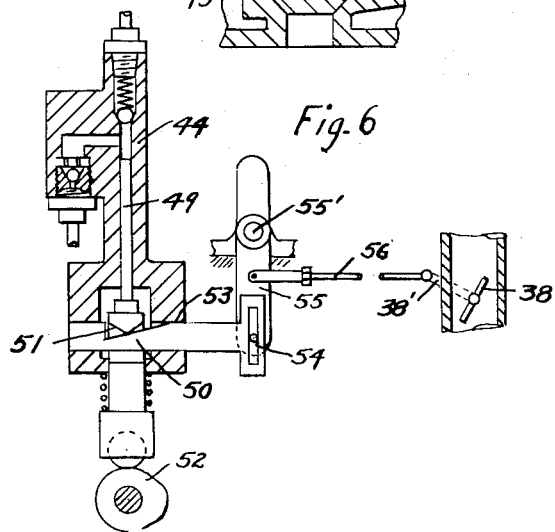
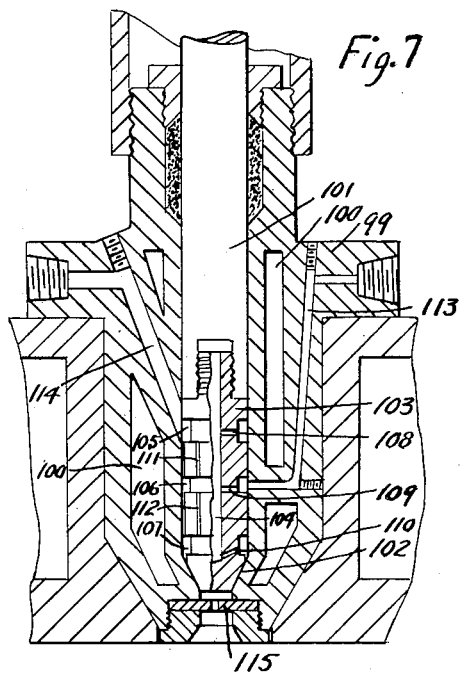
INVENTOR
Louis O. French

Patented Oct. 3, 1933

1,928,754

UNITED STATES PATENT OFFICE 1,928,754

METHOD OF AND APPARATUS FOR PREPARING AND USING FUEL IN INTERNAL COMBUSTION ENGINES

Louis O. French, Milwaukee, Wis.

Application October 22, 1927. Serial No. 228,033

5 Claims. (Cl. 123—33)

The invention relates to a method of and apparatus for preparing and using fuel in internal combustion engines.

One of the objects of this invention is to provide an apparatus for generating a fuel atomizing gas of high pressure and preferably high heat which on coming in contact with the fuel and expanding from a higher to a lower pressure will disrupt the fuel into small particles and simultaneously heat and chemically react on said particles so that liquid fuel or semi-liquid fuel will be efficiently atomized and vaporized or gasified. According to the method of the present invention the atomizing gas is formed in what may be termed an internal combustion compressor, which may also have prime mover functions, this compressor being an internal combustion engine primarily having compressor functions and from which highly heated pressure gases are taken during the period of high pressure in the cycle of such engine, the fuel being subjected to the action of these gases either for direct atomizing injection of the fuel into the engine cylinder or for injection of the fuel into a vaporizing or gasifying chamber outside the cylinder from which the treated fuel is delivered to the engine as a vapor or gas. Preferably, the internal combustion compressor, distinct and separate from the engine cylinder, operates on the constant volume cycle of combustion so that a portion of the gas generated therein by compression and the high heat of combustion may be released therefrom during the periods of highest pressure in the combustion cycle, and the preferred method is to use a constant volume cycle of combustion with high compression so that complete combustion of the fuel charge in the compressed air, acting as the atomizing gas, will be effected before or shortly after the piston reaches its upper dead center position. The apparatus and the method hereinafter described are applicable for use in engines of the low, medium or high compression classes of injection type engines and to engines of the carburetting type.

In its preferred form the internal combustion compressor forms a part of the engine and is operatively connected to the engine crank-shaft so that the prime mover functions of the compressor may be used, by itself or as a booster for a starting motor, for the starting of the engine and the atomizing gas furnished by the internal combustion compressor may be used to heat the power cylinders, which is especially advantageous in the case of injection type engines.

The invention further consists in the several features hereinafter set forth and more particularly defined by claims at the conclusion hereof.

In the drawings Fig. 1 is a view, generally in section, of an apparatus embodying the invention, showing it associated with a carburetting type of engine;

Fig. 2 shows certain modifications of the fuel feed and mixing arrangement;

Fig. 3 is a view, generally in section, of an apparatus embodying the invention, showing it associated with an injection type engine;

Fig. 4 is an elevational view, partly in section, of an engine equipped with fuel-treating apparatus embodying the invention;

Fig. 5 is a detail sectional view taken on the line 5—5 through the discharge valve shown in Fig. 3;

Fig. 6 is a detail view of a mixture control means;

Fig. 7 is a detail view of a fuel injector useable in the apparatus.

In the carburetting internal combustion engine field, gasoline and its substitutees, preheated kerosene or distillate, and in rare instances alcohol, are used as fuels. There exists, however, a demand for an internal combustion engine in this class which will handle heavy oils or even semi-liquid fuels, such as so-called amalgams of very finely divided coal dust and liquid fuel, but the heavy oil carburettors heretofore proposed for engines of this class have not been commercially successful. If heavy oils or even semi-liquid fuels are to be used in low compression or carburetting type engines, such fuel must be reduced to a finely atomized condition and while so atomized subjected to a temperature high enough to convert it from its liquid state to a vaporous or gaseous state, and the present invention has been devised to effect this result.

Referring to Fig. 1, the numeral 8 designates what I will term an internal compustion compressor. This is an internal combustion engine of any suitable construction modified by the provision of a discharge valve 9, here shown as held closed by a spring 10 and opened by a tappet lever 11 engaged by a rod 12 carried by a tappet 13 whose roller rides on a cam 14 mounted on a layshaft 15 driven by the engine, as by a chain 16 connecting a sprocket 17 on said shaft with a sprocket 18 on the crank shaft 19 of the engine. An engine operating on the constant volume or predominately constant volume cycle of combustion is preferred as it insures a rapid rise in pressure and I have shown a two-stroke engine of the three port type with crank case compression in which 20 is the exhaust port, 21 the scavenge inlet port, 22 the transfer passage connected with the crank case by a slot 23 in the piston, the fuel and air being drawn in from a carburettor 24 through a port 25 which communicates with the crank case when the piston 26 is at the top of its stroke. I prefer to use in this engine compression pressures above the preignition temperature of the fuel when the engine is warmed up and in some instances I may use compression pressures sufficient to produce compression ignition when starting from cold, since I am primarily concerned in securing gases therefrom at high pressures and temperatures and want combustion to be practically complete as the piston starts to reverse its direction of travel, at which time the valve 9 opens for a brief interval to allow a certain portion of the gases to escape from the cylinder 27 to the pipe 28 for use in atomizing the fuel charge for the main engine cylinders while the remainder of the charge in the combustion compressor is allowed to expand, doing work against the piston. If lower compression pressures are used the usual spark-plug 29 may be used to effect ignition of the charge.

The relatively non-volatile fuel to be vaporized or gasified is fed into a small chamber 30, by any suitable feeding means, in advance of an atomizing gas charge, and is picked up therefrom and carried thereby through a spray nozzle 31 and thus sprayed into a chamber 32 and converted from its liquid condition to gaseous or vaporous condition from which chamber it is conducted to the engine manifold or to the individual engine cylinders adjacent the intake valves. If further heat is necessary to maintain the gasified fuel in its gaseous state the chamber 32 is provided with a jacket space 32' receiving hot gases from the exhaust manifold of the engine and the manifold itself may be of the exhaust heated type. In Fig. 1 I show a pipe 33 leading from the chamber 32 to a nozzle 34 delivering fuel into the intake passage 35 adjacent the inlet valve 36 controlling the inlet port in the cylinder head 37 of the engine and a butterfly valve 38 associated with the passage 35 to control the supply of air taken into the engine. In Fig. 2 I show a nozzle 39 communicating with chamber 32 and delivering the vaporized or gasified fuel into the throat of a Venturi passage 40 associated with the lower end of an intake manifold 41 and an air intake passage 42 controlled by a throttle valve 43.

In Fig. 1, as a means for feeding fuel to the chamber 30, I show a fuel-metering pump 44, which may be of any suitable construction, discharging its metered charge of fuel in advance of the atomizing blast gas through a pipe 45, passage 46, past a check valve 47 and an apertured plate 48, said pump being timed relative to the compressor. Where a metered feed is used the quantity of fuel will vary with the throttle valve setting and where a fuel pump is used the adjustment of the throttle valve for varying loads may be interconnected with the fuel pump so as to decrease the amount of fuel metered to the chamber 30 as the throttle is closed. As an example, in Fig. 6 I show the fuel pump 44 with a spring-returned plunger 49 whose stroke is varied by an adjustable wedge 50 working in a slot 51 in the head of the plunger and serving to hold it more or less out of the full lift stroke of the engine-driven cam 52, which wedge is slidably mounted in a guide 53 and has a slot 54 receiving a pin carried by a lever 55 pivoted at 55' and operatively connected by a link 56 with the lever arm 38' of the valve 38.

In Fig. 2 the fuel-feeding means comprises a supply chamber 57 receiving fuel from a supply pipe 58 controlled by a float-operated valve 59, the fuel being conducted through a passage 60, orifice 61, past a check valve 62 and grid 63 to the chamber 30 by the suction effect of the engine, the orifice being varied by an adjustable needle valve 56.

The amount of atomizing gas may be varied by the design of the cam 14 which may be slidably mounted on the shaft 15 and tapered either to vary the lift or duration of lift in accordance with the position of the engine throttle air valve, but these refinements are not believed to be necessary as it is simpler to provide sufficient gas to handle the largest fuel charges.

With the above construction it will be noted that the combustion compressor, being separate from the working cylinders of the engine, may be designed to best effect its principal function of furnishing blast gases and that when said gases come into direct contact with the fuel and expand from a higher to a lower pressure they will efficiently break the fuel into extremely small particles and simultaneously impart their heat thereto so as to either convert the heavy fuel into a relatively fixed gas or into sufficiently vaporized condition for efficient use in the engine. Furthermore, where the compressor has a driving connection with the engine the main working cylinders may be started directly on the running fuel since the heat of the blast gas is instantly available on starting.

In the true Diesel type engines in general use at the present time, a multi-stage air compressor is used to furnish blast air for spraying the liquid fuel into the engine cylinder and because of the liability of explosion this air is kept at a low temperature and, on introduction into the engine cylinder, has a refrigerating effect on the combustion process so that compression pressures of the air in the cylinder have to be increased to overcome this cooling effect at the expense of a certain amount of negative work or lost energy.

According to the present invention and referring to Fig. 3, compression of air is carried out in the working cylinder 85, internal combustion of air and fuel in another cylinder 67, release of gas from said last-named cylinder while at a higher pressure than that existing in the working cylinder during combustion, injection of the fuel charge into the working cylinder by said heated and high pressure gas during or at the end of the compression of air in the working cylinder followed by ignition of the fuel charge, expansion and exhaust of the products of combustion in both cylinders. By this method, the fuel being converted from a liquid to a vaporous condition at high pressure by the atomizing gas and at a higher temperature than that of the air injection Diesel, I am able to use lower compression pressures than are used in the air injection Diesel or high compression solid fuel injection engines. For example, I may use compression pressures of 300 to 350# per sq. in. in the working cylinder 85 and attain ready starting by the self-ignition of the charge or the use of an ordinary spark igniter, if necessary, without, however, decreasing the efficiency of the engine over those using higher compressions, since it has been shown that an engine operating on a constant pressure cycle or a mixed cycle (partly constant pressure and partly constant volume) has its highest efficiency when the compression pressure of the air within the cylinder is about 310# per sq. in., which is sufficient for autoignition of the fuel charge, when running, without cold air injection. This cycle or method of operation, involving the combination of combustion in both cylinders and transfer of thermal energy from the combustion compressor to the working cylinder to improve the working conditions thereof, is believed to be more efficient than the air injection Diesel and solid injection high compression cycles for the negative work required for the compression of the atomizing charge and the loss of heat energy to the compressor cylinder while forming this charge is more than offset by the lower compressions available for use in the engine cylinder, without sacrificing thermal efficiency, and the expansive action of the gases in both cylinders.

Referring to Fig. 3, the internal combustion compressor is shown as a three port, crank case compressor, two cycle engine in which the fuel is delivered by an engine-driven pump 65 to a nozzle 66 into the engine cylinder 67 at the desired time in the cycle and this engine is preferably operated on the constant volume or a predominantly constant volume combustion cycle for the reason previously given so that high pressures may be obtained as, for example, 500 to 850# per sq. in., depending upon the compression pressure in the main working cylinder and allowing for an excess injection pressure of 300 to 400# per sq. in. over said compression pressure, depending upon the design of the fuel atomizer. The atomizing gas, released from the cylinder 67 during the high pressure period as the piston reverses or starts on its downward stroke by the opening of spring-closed valve 68 by an engine-driven cam 98 acting on the lever 97, passes through pipe 69', past check-valve 70 to a small pressure-equalizing, separator and storage chamber 71, the exit from which is preferably controlled by a cooled pressure-regulating valve 72, similar to the valve 68 except that it opens automatically against the pressure of its closing spring which releases the gases at the desired injection pressure to the injector feed pipe 73 connected with a passage 74 of the fuel injector 75. The pipe 69' extends down into the chamber 71 while the exit leads off from the top so that said chamber acts as a separator of any solid particles in the gases. This injector may be like constructions commonly employed on air injection Diesel engines and either of the closed or open type, depending upon the design of the engine.

Fig. 3 shows an injector of the closed type which includes a casing 76, a suitably packed needle-valve 77 controlling passage of fuel through the nozzle 78 and closed by a spring 79 and opened by a lever 80 associated with an engine-driven cam 81, the atomizer disks 83 and the liquid fuel passage 84' which preferably discharges below the upper finely perforated disk 84 to prevent any possibility of blow back, the fuel being delivered to the passage 84' in the usual manner from any suitable fuel-metering pump. With this construction the opening of the valve 77 causes the fuel adjacent the nozzle to be blasted into the engine cylinder 85 near or at the end of the compression stroke of the engine by the heated and high-pressure gas received from the compressor, and because of the heating effect of these gases the compression pressure of the air in the cylinder may be reduced from that of regular practice in air injection engines without decrease in efficiency or interference with ready starting. Furthermore, where the gases are at a high temperature when introduced into the working cylinder with the fuel charge their heat may augment that of the air under compression to secure ready starting from cold without auxiliary ignition devices. Furthermore, before turning on the fuel for the main engine the same may be run or turned over against its friction under decompression and the hot injection gas used to heat the cylinder to facilitate starting.

By the term "decompression" I mean that condition in which the engine is placed on the compression stroke either by the opening of relief valves or the inlet or exhaust valves of the engine so that the pistons do not work against any, or a portion only, of the compression used in running.

It is appreciated that the discharge valve of the compressor is operating under high heat conditions and where the valve is large it must be cooled. In Figs. 3 and 5 I have shown the valve 68 provided with a cooling space 87 communicating with a space provided by a multiple bellows diaphragm 88 secured at one end to the flanged head of the valve and at its upper end to a fixed plate 89. The entrance pipe 90 for the cooling fluid extends down through the plate 89 to a position adjacent the head of the valve and the return pipe 91 leads off from the upper end of the space 87. By using a bellows diaphragm I have dispensed with flexible or jointed pipe connections. The jacket space 92 of the head surrounds both the seat and the stem of the valve which is provided with piston rings 93 for preventing leakage. The valve is normally held closed by a spring 94 interposed between its flanged head and a ring 95 secured to the cage 96 and is opened at the proper time in the cycle by a forked lever 97 engaging the lower side of the flange and actuated by an engine-driven cam 98.

It is desired to use the gas furnished by the internal combustion compressor at as high a heat as the valves controlling it can stand under practical service conditions and to insure efficient service of the injector valve under very high heat conditions there is shown in Fig. 7 details of an injector valve especially designed with this in view, wherein the numeral 99 designates a casing having cooling jacket spaces 100 surrounding the stem of the valve 101 and its seat 102. The valve 101 is preferably formed in two pieces including a renewable tip portion 103 and has a centrally disposed bore 104, annular grooves 105, 106 and 107, a passage 108, a passage 109 and a passage 110 respectively connecting said grooves with said bore and lengthwise extending, radially arranged grooves 111 between the grooves 105 and 106, and similar grooves 112 between the grooves 106 and 107. The fuel from the metering pump is delivered through the passage 113 to the space provided by the groove 106 so that some of it may pass through the passage 109 to the bore 104. The atomizing gas is delivered through the passage 114 to the space provided by the groove 105. When the valve 101 is opened the atomizing gases passing into the groove 105, and some of which passes through the passage 108 in to the top of the bore 104, will blow the fuel from the space formed by the groove 106 and from the space in the communicating bore 4 into the space formed by the groove 107 and thence past the valve seat and nozzle plate 115 into the engine cylinder, the gases also passing down through the grooves 111 and 112 to disrupt the fuel.

In Fig. 4 I have shown the internal combustion compressor associated directly with the engine, the piston being operatively connected by the rod 116 to a crank formed on or directly connected to the crank shaft 117 of the engine, and I have also shown the fuel pump 65 for furnishing fuel to the compressor and the fuel pump plungers for the main working cylinders as driven from the cams 52 on the crank shaft, with a starter claw 118 at the end of the crank shaft. By connecting the compressor in this way it can act as a starting engine or a booster for a starting motor since the gases remaining in its cylinder during the expansion stroke will do work against its piston and transmit power to the crank shaft.

I have shown a single cylinder combustion compressor which is driven at crank shaft speed but this compressor may have two cylinders or may be driven at greater or less than crank shaft speed to suit conditions and may be otherwise varied to take care of varying conditions. Since the amount of gas required for treating the fuel is relatively small compared to the cylinder volume of the engine, the compressor can be made small so that it will well withstand the high pressures which may be employed. Since it has no connection with the working cylinder itself it may be designed solely with regard to its own particular functions and does not interfere with the normal working cycle of the engine itself. Furthermore, a single compressor will readily handle the requirements of multi-cylinder engines and yet not be so small that it cannot be readily manufactured and efficiently cooled and lubricated.

It is also to be noted that in those instances where preignition occurs in the internal combustion compressor, necessitating negative work, such work is not lost entirely as the heat of the atomizing gases is preferably used to supply heat to the working cylinder to more efficiently carry out the combustion process and with less negative work of compression of the greater air charge in the working cylinder.

I desire it to be understood that this invention is not to be limited to any particular form or arrangement of parts or methods except insofar as such limitations are included in the claims.

What I claim as my invention is:

1. The combination with an internal combustion engine including a working cylinder, an internal combustion compressor having a cylinder of relatively smaller capacity than said first-named cylinder, a crank shaft, each of said cylinders having a piston working therein and operatively connected to said crank shaft, means for burning a fuel charge in the compressor cylinder at pressures greater than that existing in the working cylinder during combustion, a fuel atomizer for the working cylinder, means for supplying liquid fuel thereto, and means for supplying said atomizer with gases from said compressor cylinder during the high pressure period of its cycle for injecting the liquid fuel charge into the working cylinder.

2. In a power producing apparatus, the combination with a working cylinder and a fuel atomizer discharging into said cylinder, of a high pressure internal combustion compressor comprising an internal combustion engine operating on a higher compression ratio than that of the working cylinder and having its combustion chamber operatively connected with said fuel atomizer for furnishing blast gas for said atomizer during the high pressure period in the cycle of said internal combustion compressor.

3. The method of preparing and introducing liquid fuel charges into the working cylinder of an internal combustion engine which comprises producing a blast gas having a higher pressure than that existing in said working cylinder during its power stroke by the combustion of fuel in compressed air, heating and injecting the liquid fuel charge for the working cylinder into the air charge for said cylinder by said blast gas near or at the end of the compression of said air charge.

4. The combination with an internal combustion engine including a working cylinder, of a fuel atomizer, means for supplying a fuel charge to said atomizer, an auxiliary cylinder, means for burning a fuel charge in said auxiliary cylinder at pressures greater than that existing in said working cylinder during combustion to produce a high pressure blast gas, and means for supplying said atomizer with said high pressure blast gas for injecting said liquid fuel charge into said working cylinder.

5. The method of preparing and introducing liquid fuel into the working cylinder of an internal combustion engine which consists in generating an atomizing gas of greater pressure than that existing in the engine cylinder during combustion by the burning of air under compression and fuel partly at constant volume and partly at constant pressure as a separately controlled combustion process, and subjecting the liquid fuel portion of the charge of the working cylinder of the engine as it is introduced into the combustion chamber thereof to the direct atomizing and heating action of said atomizing gas while at high temperature and pressure.

LOUIS O. FRENCH.